Dec. 17, 1968 W. M. WALTON Re. 26,509

PULSATION TYPE PUMPS

Original Filed March 9, 1962 3 Sheets-Sheet 1

INVENTOR

William Melin Walton

BY

Andrew F. Winterscheidt

ATTORNEY

PULSATION TYPE PUMPS

Original Filed March 9, 1962 3 Sheets-Sheet 2

INVENTOR
William Melin Walton

BY
Andrew F. Winterscon
ATTORNEY

INVENTOR
William Melin Walton
BY
Andrew F. Winterscheid
ATTORNEY

United States Patent Office

Re. 26,509
Reissued Dec. 17, 1968

26,509
PULSATION TYPE PUMPS

William Melin Walton, Rockford, Ill., assignor to The Chemical Rubber Company, Cleveland, Ohio, a corporation of Ohio Original No. 3,171,360, dated Mar. 2, 1965, Ser. No. 178,677, Mar. 9, 1962. Application for reissue Dec. 8, 1965, Ser. No. 532,481
33 Claims. (Cl. 103—148)

Matter enclosed in heavy brackets [ ] appears in the original patent but forms no part of this reissue specification; matter printed in italics indicates the additions made by reissue.

This invention relates to pulsation type pumps, and the principal object is to provide an economical, efficient, and sanitary pumping means of the pulsation type. The present pulsation type pump should be useful in the medical, pharmaceutical, industrial, novelty, liquid and beverage dispensing, and many other fields. Inherently, its design provides a means of fluid transfer without direct contact of the pumping mechanism with the fluid being pumped, thereby eliminating the necessity for seals. In addition, by utilizing orifice devices as described herein, relatively high pressure heads can be developed and bi-directional flow characteristics and/or pressure heads can be obtained.

The present invention provides, in combination, a striker means or armature reciprocating at a relatively high frequency and working against a fluid conductor in a substantially transverse direction, said fluid conductor being supported and/or backed up by an abutment means, and the abutment means being substantially in line with the striker path. The fluid conductor does not have to be closed off to obtain flow pressure. For various contemplated applications, adjustable orifice devices and/or abutments and/or striker means are utilized to obtain higher flows and/or pressures, and/or bi-directional flow and/or predetermined pressure characteristics.

The fluid conductor or transfer means for this type pump preferably is of a resilient nature having a restoration or vibration periodicity approximately equal to or only slightly less than the frequency of the striker means. The striker means is preferably of a substantially rigid nature and inclined with respect to the fluid transfer means, when orifice devices are not used, being less inclined or more nearly parallel relative to the fluid transfer means when one orifice device is utilized, and being parallel to the fluid transfer means when two orifice devices or an adjustable abutment means is utilized to obtain bi-directional flow/pressure characteristics. For various contemplated applications, the abutment means and/or striker means may be flat, curved, convex, or concave adjacent to the fluid transfer means.

In this application, the reciprocable striker means is shown as the armature, or as an extension of the armature, of an alternating current or pulsating direct current electromagnetic vibratory system. Conceivably, any relatively straight line mechanical movement of the striker means working at a relatively high frequency would accomplish all of the results described herein.

A more complete understanding of the invention will result from the following detailed description, in which reference is made to the accompanying drawings, wherein.

Similar reference numerals are applied to corresponding parts throughout these views.

Figure 1:
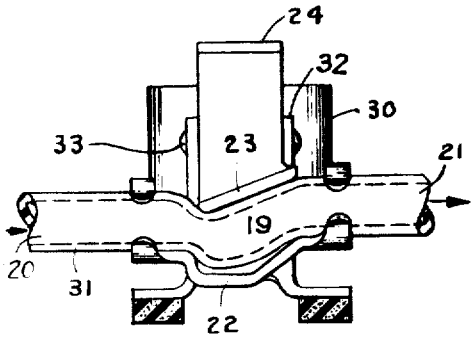
FIG. 1 is an end elevation depicting one form of the pulse pump.
Figure 2:
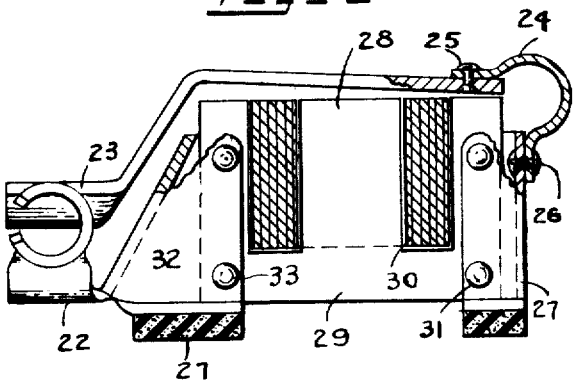
FIG. 2 is a side view of FIG. 1.
Figure 3:
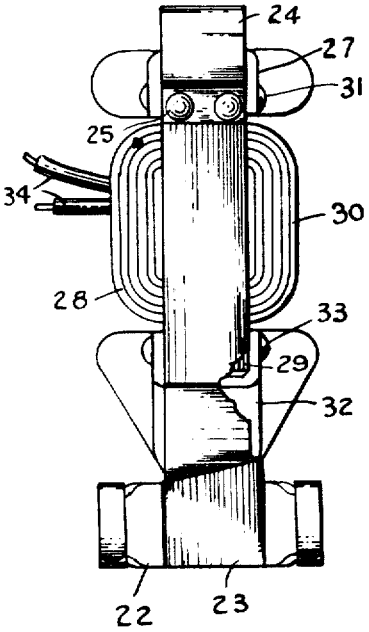
FIG. 3 is a top view of FIG. 1.

Referring to the drawings, but first to FIGS. 1–3, the fluid transfer means 19 contains the pumping media and is considered as having an inlet side 20 and a discharge side 21. The fluid transfer means is in the form of a resilient rubber or plastic tube supported between an abutment 22 and a reciprocable striker 23, the latter being secured to a C-spring 24 with rivets 25 or other means that will insure a rigid relationship. Rivets 26 fasten the spring 24 in rigid relationship with a mounting bracket 27, which is attached to one end of the electromagnet unit 28, comprising core 29 and electromagnet winding 30, by rivets 31 or other suitable fastening means. Abutment 22 is carried on a bracket 32 secured by rivets 33 to unit 28 at its opposite end from bracket 27. The fluid transfer means 19, striker means or armature 23. spring 24, abutment 22, and electromagnet unit 28 comprise a vibrator unit or device. With the vibrator device or unit assembled as shown in FIG. 1 and the conductors 34 connected to a source of pulsating direct current or to an alternating current power source supplying a relatively high excitation frequency, approximately equal to the vibrator frequency, a substantial vibration of the striker 23 results. This vibration is used alternately to compress and release the resilient fluid transfer means 19 against abutment means 22. On the compression stroke of the striker 23, the media being pumped in the fluid transfer means 19 is forced by a reducing volume change (a reducing inlet space 20), and by inertia, due to the shape and inclination of the striker 23 to flow towards the discharge side 21 of the fluid transfer means. When the striker 23 releases the fluid transfer means 19, an increasing volume change in the fluid transfer means creates a negative pressure, thereby drawing in the pumping media for replacement. Since the striker has imparted a flow inertia of the pumping media towards the discharge side 21 of the fluid transfer means 19 and the inlet space 20 is increasing, the majority of the volumetric replacement will be from the inlet side 20 of the fluid transfer means 19. The compression and release sequence repeats many times per second, depending on the excitation frequency, and fluid flow/pressure result.

Figure 4:
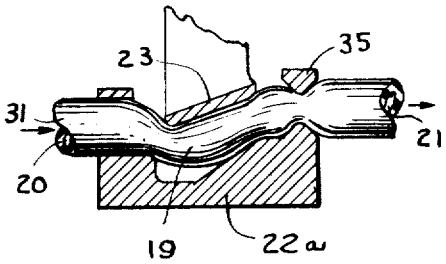
FIG. 4 is a detail, partially in section, of a modified form of the pulse pump.

The modification shown in FIG. 4 employs principles similar to those described with reference to the preceding figures, but involves an additional feature. A fixed orifice device 35, shown as part of the abutment means 22a and located spaced from but relatively close to the striker 23 on the outlet side 21 of the fluid transfer means 19, is utilized to obtain higher head/pressure outputs. Best spacing will be determined by application and experiment.

Figure 5:
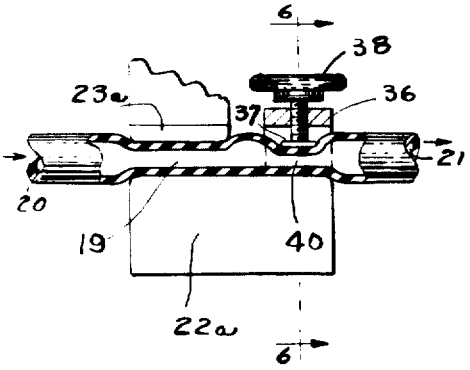
FIG. 5 is another detail, partially in section, of another modified form of the pulse pump.
Figure 6:
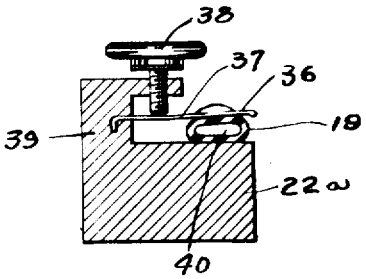
FIG. 6 is a sectional detail taken on line 6—6 of FIG. 5.

FIGS. 5 and 6 depict a modification wherein the reciprocable striker 23a is parallel to the fluid transfer means 19 and abutment means 22a, and an adjustable resilient orifice device 36, comprising leaf spring 37, thumb screw 38, and abutment means 39 is utilized to obtain flow/pressure. On the compression stroke of this structure, the liquid being pumped is forced towards both the inlet side 20 and outlet side 21 of fluid transfer means 19. Spring 37 yields to permit an orifice area 40 increase due to increased liquid pressure generated from the striker impact against the resilient fluid transfer means, thereby permitting more liquid passage towards the outlet side 21 of fluid transfer means 19 than if the orificing device were rigid. When the striker releases the fluid transfer means, an increasing volume change in the fluid transfer means creates a reduction in pressure, requiring liquid for replacement. Since the internal liquid pressure is reduced, spring 37 will reduce the orifice area 40, thereby making liquid replacement easier from the inlet side 20 and consequently flow/pressure towards discharge side 21. The compression and release sequence is repeated many times per second, depending on the excitation frequency, and fluid flow and/or pressure result. Once flow is initiated, flow inertia of the liquid through the entire length of the fluid transfer means 19 will aid liquid replacement. Thumb screw 38 can be adjusted to obtain optimum orificing conditions for various head requirements.

Figure 7:
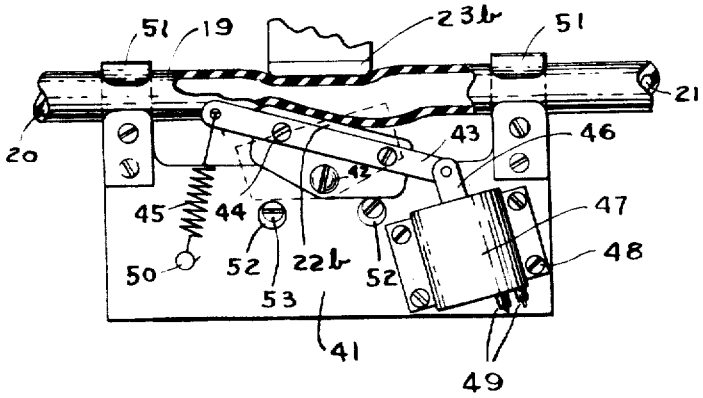
FIG. 7 is a view similar to FIG. 5, partially in section, of another modified form of the pulse pump.

FIG. 7 depicts a further modification wherein the striker 23b is located parallel to base 41 on which an adjustable abutment means 22b is oscillatably mounted with shoulder screw 42 or other suitable bearing means. Actuating arm 43 is secured to the abutment means by two screws 44 or other suitable fastening means and is connected at one end with tension spring 45, and at the other end with solenoid plunger 46. Solenoid 47 is secured to the base 41 by four screws 48 and is energized when required through leads 49. Spring 45 has one end attached to base 41 as at 50. Fluid transfer means 19 is supported by clamps 51 on base 41, and rotatably adjustable cams 52, that act as stops for the abutment means 22b, are secured to the base with shoulder screws 53.

In operation, FIG. 7 shows the plunger 46 of solenoid 47 in an energized position. For this condition, flow through fluid transfer means 19 will be from left 20 to right 21 and operation will be similar to that described for FIG. 1. In this case the abutment means 22b forms the incline which determines flow direction. When solenoid 47 is de-energized, abutment means 22b assumes the dotted line position under action of spring 45 and flow through fluid transfer means 19 will be from right 21 to left 20. Operation for this position will also be otherwise similar to that described in FIG. 1, where the flow is always from left to right. Adjustable cams 52 can be regulated to equalize or vary the flow and/or pressure in opposite directions.

Figure 8:
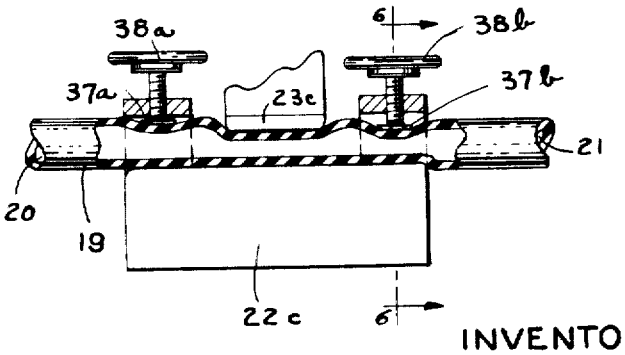
FIG. 8 is another view, similar to FIG. 7, partially in section, depicting a further modified form of the pulse pump.

FIG. 8 depicts a modification employing principles described for FIGS. 5 and 6. Two thumb screws 38a and 38b and springs 37a and 37b are mounted on abutment means 22c to obtain bidirectional flow/pressure characteristics. For this structure, flow and/or pressure will be towards the smaller fluid transfer means cross-section area. In FIG. 8 the flow direction would be from left 20 to right 21.

Figure 9:
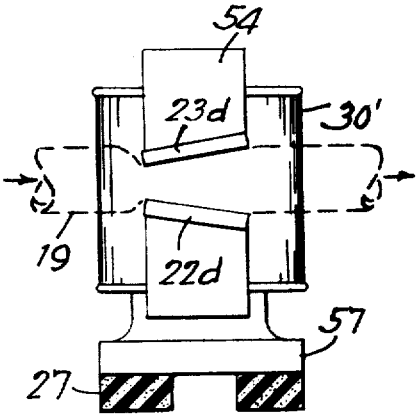
FIGS. 9 and 10 are views similar to FIGS. 1 and 2, showing a modification in which a C-spring provides two oppositely inclined strikers on its two arms disposed on opposite sides of the conduit.
Figure 10:
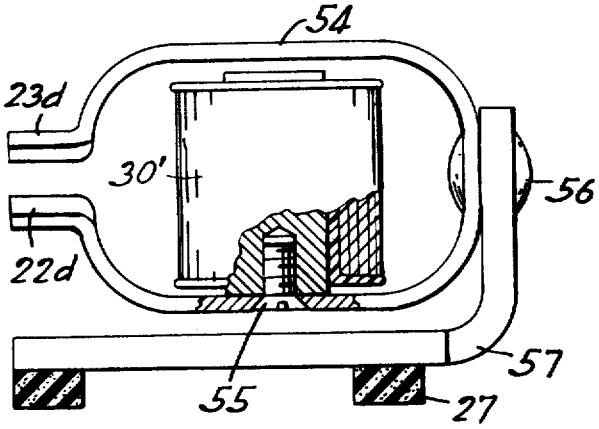
Figure 11:
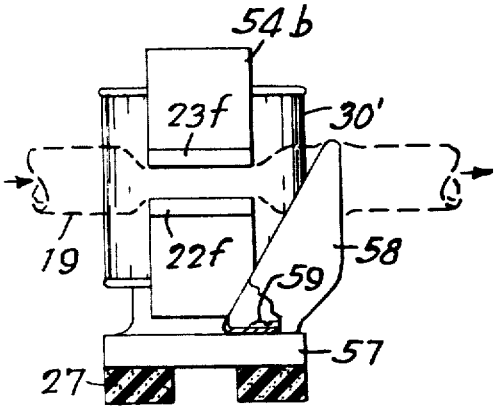
FIG. 11 is an end view like FIG. 9 showing another variation in which the two strikers on the C-spring are parallel, along the lines of FIG. 5, where the single striker is parallel to the abutment.
Figure 12:
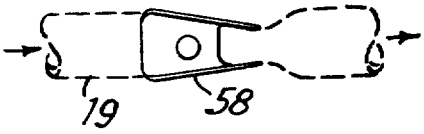
FIG. 12 is a top view of the spring fork shown in side elevation in FIG. 11, giving yieldable compression of the conduit, similarly as the leaf spring of FIGS. 5–6.
Figure 13:
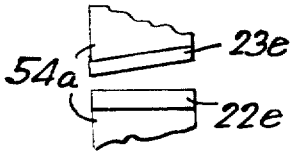
FIG. 13 is a fragmentary end view of another C-spring, modified to provide one inclined striker as in FIG. 9 and the other striker without inclination, as in FIG. 11.

In conclusion, while I have disclosed a striker operating against one side of a resilient yieldable-walled tubular fluid transfer conduit, and a rigid support or abutment engaging the opposite side, I do not wish to be limited to such a combination, inasmuch as strikers may be operated in opposed relationship to one another on opposite sides of such a conduit. For example, as shown in FIGS. 9 and 10, a C-spring 54 may provide the two strikers 22d and 23d by its two arms disposed on opposite sides of the conduit, the arms also functioning as armatures on opposite sides of an electromagnetic solenoid coil 30' to work as a dual vibrator, the coil being fixedly supported by means of a screw 55 to the middle portion of one arm of the C-spring in closely spaced relation to the other arm of said C-spring, the latter being secured, as at 56 to an arm of a generally L-shaped base 57. The striker 23d on one arm of said C-spring should, of course, be shaped and inclined similarly as the strikers 23 in FIGS. 1 and 4, and the other striker 22d on the other arm of said C-spring may be oppositely inclined, as shown, or shaped and disposed like the abutments 22 and 22a of FIGS. 1 and 4, as seen at 22e in FIG. 13, the other striker 23e of this C-spring 54a being inclined, like striker 23d. In other forms, as shown in FIG. 11, the two strikers 23f and 22f on the C-spring arms can be shaped and disposed as the striker **23*a* or 23*b* or 23*c* and abutment 22*a* or 22b or 22c of FIGS. 5, 7 and 8. The spring fork 58, secured by its cross-portion to the base 57, as seen at 59, serves as an adjustable resilient orifice device similarly as the leaf spring 37** in FIGS. 5 and 6.

It is believed the foregoing description conveys a good understanding of the objects and advantages of my invention. The appended claims have been drawn to cover all legitimate modifications and adaptations.

I claim:

1. A pumping apparatus comprising a resilient, yieldable-walled tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, and means for reciprocating the striker at high frequency and through a short stroke in relation to the diameter of the conduit to pulsate the wall of said conduit accordingly.

2. A pumping apparatus as set forth in claim 1, including means located close to the striker on the outlet side of the conduit relative to the striker defining a restriction in the bore of said conduit by external pressure on the wall thereof.

3. A pumping apparatus as set forth in claim 1, in which the resilient yieldable-walled tubular fluid transfer conduit has walls the restoration periodicity of which is compatible with the rate of high frequency reciprocation of said striker.

4. A pumping apparatus as set forth in claim 3, including means located close to the striker on the outlet side of the conduit relative to the striker defining a restriction in the bore of said conduit by external pressure on the wall thereof.

5. A pumping apparatus comprising a resilient, yieldable-walled, tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, and electromagnetic vibrator means having an armature reciprocating through a short stroke in relation to the diameter of the conduit at high frequency transmitting drive to said striker to pulsate the wall of said conduit accordingly.

6. A pumping apparatus as set forth in claim 5, including means located close to the striker on the outlet side of the conduit relative to the striker defining a restriction in the bore of said conduit by external pressure on the wall thereof.

7. A pumping apparatus as set forth in claim 5, in which the resilient yieldable-walled tubular fluid transfer conduit has walls the restoration periodicity of which is compatible with the rate of high frequency reciprocation of said striker.

8. A pumping apparatus as set forth in claim 7, including means located close to the striker on the outlet side of the conduit relative to the striker defining a restriction in the bore of said conduit by external pressure on the wall thereof.

9. A pumping apparatus comprising a resilient, yieldable-walled, tubular fluid transfer conduit and a relatively hard striker reciprocable at a high frequency against one side of said [resilient yieldable-walled tubular] fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, and means for reciprocating the striker at high frequency and through a short stroke in relation to the diameter of the conduit to pulsate the wall of said conduit accordingly.

10. A pumping apparatus comprising a resilient, yieldable-walled, tubular fluid transfer conduit and a relatively hard striker reciprocable at a high frequency against one side of said fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, means for reciprocating the striker at high frequency and through a short stroke in relation to the diameter of the conduit to pulsate the wall of said conduit accordingly, and manually adjustable means disposed close to the striker on the outlet side of said conduit relative to said striker for adjustably restricting the bore of said conduit by external pressure on the wall thereof.

11. A pumping apparatus comprising a resilient, yieldable-walled tubular fluid transfer conduit and a relatively hard striker reciprocable at a high frequency against one side of said fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, and electromagnetic vibrator means having an armature reciprocating through a short stroke in relation to the diameter of the conduit at high frequency transmitting drive to said striker to pulsate the wall of said conduit accordingly.

12. A pumping apparatus comprising a resilient, yieldable-walled, tubular fluid transfer conduit and a relatively hard striker reciprocable at a high frequency against one side of said fluid transfer conduit to pulsate the wall thereof, a support for the opposite side of said fluid transfer conduit diametrically opposite the area of impact from the striker, said striker having a conduit engaging face that is inclined at an acute angle longitudinally with respect to said fluid transfer conduit, manually adjustable means disposed close to the striker on the outlet side of said conduit relative to said striker for adjustably restricting the bore of said conduit by external pressure on the wall thereof, and means for reciprocating the striker at high frequency and through a short stroke in relation to the diameter of the conduit to pulsate the wall of said conduit accordingly.

13. A pumping apparatus comprising a resilient, yieldable-walled, tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, means for reciprocating the striker at high frequency and through a short stroke in relation to the diameter of the conduit to pulsate the wall of said conduit accordingly, and manually adjustable means for applying pressure externally on the wall of said conduit on the inlet side and outlet side thereof, respectively, relative to said striker to provide a predetermined but adjustable restriction in the bore of said conduit at the inlet side, and a greater but adjustable restriction in the bore of said conduit at the outlet side.

14. A pumping apparatus as set forth in claim 13, including yieldable resilient means interposed between the manually adjustable means and said conduit to apply pressure yieldingly to wall, said yieldable resilient means and the walls of said conduit both having a restoration periodicity compatible with the rate of high frequency reciprocation of said striker.

15. A pumping apparatus comprising a resilient, yieldable-walled, tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, means for reciprocating the striker at high frequency and through a short stroke in relation to the diameter of the conduit to pulsate the wall of said conduit accordingly, and means whereby a restriction is provided in the bore of said conduit at the inlet side thereof relative to the striker and a greater restriction is provided in the bore of said conduit at the outlet side thereof relative to the striker.

16. A pumping apparatus as set forth in claim 15, including in combination with said last mentioned means of yieldable resilient means permitting opening up of said restrictions, said yieldable resilient means and the walls of said conduit both having a restoration periodicity compatible with the rate of high frequency reciprocation of said striker.

17. A pumping apparatus comprising a resilient, yieldable-walled, tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, and means for reciprocating the striker at high frequency and through a short stroke in relation to the diameter of conduit to pulsate the wall of said conduit accordingly, the support for the conduit on the opposite side from the striker being inclined at an acute angle relative to the striker in diverging relationship to the striker and conduit toward the outlet side of said conduit relative to the striker.

18. A pumping apparatus as set forth in claim 17, including means located close to the striker on the outlet side of the conduit relative to the striker defining a restriction in the bore of said conduit by external pressure on the wall thereof.

19. A pumping apparatus as set forth in claim 17, in which the resilient yieldable-walled tubular fluid transfer conduit has walls the restoration periodicity of which is compatible with the rate of high frequency reciprocation of said striker.

20. A pumping apparatus as set forth in claim 19, including means located close to the striker on the outlet side of the conduit relative to the striker defining a restriction in the bore of said conduit by external pressure on the wall thereof.

21. A pumping apparatus comprising a resilient, yieldable-walled, tubular fluid transfer conduit and a relatively hard striker reciprocable at a high frequency against and substantially at right angles relative to one side of said fluid transfer conduit to pulsate the wall thereof, a support for the opposite side of said fluid transfer conduit diametrically opposite the area of impact from the striker, and means for reciprocating the striker at high frequency and through a short stroke in relation to the diameter of the conduit to pulsate the wall of said conduit accordingly, said support being elongated and pivoted intermediate its ends and disposable in diverging relationship to the striker interchangeably in either of two operative positions, whereby to cause flow in either direction in said conduit.

22. An apparatus as set forth in claim 21, including spring means normally holding said pivoted support in one extreme position, and means connected with the other end of said support for shifting it to the other extreme position against the action of said spring means.

23. An apparatus as set forth in claim 21, including an electrical solenoid coil, and an armature therein connected with the support to tilt it to one extreme position when the solenoid is energized from a source of electrical current supply and to the other extreme position when the solenoid is de-energized, said support normally tending to assume the latter position.

24. A pumping apparatus comprising a resilient yieldable-walled tubular fluid transfer conduit, the walls of which are adapted to be pulsated, a pair of strikers reciprocable at a high frequency against and substantially at right angles relative to diametrically opposite sides of said conduit to pulsate the walls thereof, said strikers each having a conduit engaging face, the conduit engaging face of at least one of said strikers being inclined at an acute angle longitudinally with respect to said conduit, and means for reciprocating the strikers in unison at high frequency and through a short stroke in relation to the diameter of the conduit to pulsate the walls of said conduit accordingly.

25. A pumping apparatus as set forth in claim 24, including means located close to the strikers on the outlet side of the conduit relative to the striker defining a restriction in the bore of said conduit by external pressure on the wall thereof.

26. A pumping apparatus as set forth in claim 24, in which the resilient yieldable-walled tubular fluid transfer conduit has walls the restoration periodicity of which is compatible with the rate of high frequency reciprocation of said strikers.

27. A pumping apparatus as set forth in claim 24, in which the strikers are provided on the outer ends of a C-spring which provides two arms, the last mentioned means transmitting motion to said arms inwardly from their outer ends.

28. A pumping apparatus as set forth in claim 24, in which the strikers are provided on the outer ends of a C-spring which provides 2 arms, the last mentioned means comprising an eleteromagnetic solenoid coil rigidly mounted between and in closely spaced relation to the inner sides of said arms inwardly from their outer ends.

29. A pumping apparatus comprising a resilient yieldable-walled tubular fluid transfer conduit, the walls of which are adapted to be pulsated, a pair of strikers reciprocable on a line toward and away from one another against and at right angles relative to diametrically opposite sides of said conduit to pulsate the walls thereof, at least one of the strikers having a conduit engaging face that in inclined at an acute angle longitudinally with respect to the conduit, means whereby a restriction is defined in the bore of said conduit on one side thereof relative ot the strikers, so that one side is the inlet and the other side the outlet, and means for reciprocating the strikers in unison at high frequency and through a short stroke in relation to the diameter of the conduit to pulsate the walls of said conduit accordingly.

30. A pumping apparatus as set forth in claim 29, in which the resilient yieldable-walled tubular fluid transfer conduit has walls the restoration periodicity of which is compatible with the rate of high frequency reciprocation of said strikers.

*31. A system for pumping fluid media comprising: a conduit for receiving the media to be pumped, said conduit including a first section of an elastic material and a second elastic material section which has a cross sectional flow area which is normally constricted relative to the cross sectional flow area of said first section; and means for repetitively applying force to said first section to reduce the flow area thereof to pressurize the fluid media and enable the pressurized media to expand the normally constricted flow area of said second section for flow of fluid media from said first section to said second section and through the expanded constricted flow area of the latter, said constricted flow area, upon release of the pressure on said first section, substantially inhibiting return flow of fluid media to said first section, said normally constricted flow area of said second section being produced by an adjustable force spring acting on said second section.*

*32. A system for pumping fluid media comprising: a conduit for receiving the media to be pumped, said conduit including a first section of an elastic material, a second elastic material section which has a cross sectional flow area which is normally constrictive relative to the cross sectional flow area of said first section, and a third elastic material section including a normally constricted cross sectional flow area like that of said second section; said first section being interposed between said second section and said third section, means for repetitively applying force to said first section to reduce the flow area thereof to pressurize the fluid media and enable the pressurized media to expand the normally constricted flow area of said second and third sections for flow of fluid media from said first section to said second and third sections and through the expanded constricted flow areas of the latter; said constricted flow areas, upon release of such pressure, substantially inhibiting return flow of fluid media to said first section; and means connected with said second and third sections for selectively expanding the constricted flow area of one of said second and third sections to selectively control the direction of fluid media displacement from said first section.*

*33. A system for pumping fluid media comprising: a conduit for receiving the media to be pumped, said conduit including a first section of elastic material and a second elastic material section which has a cross sectional flow area which is normally constricted relative to the cross sectional flow area of said first section; means for repetitively applying force to said first section to reduce the flow area thereof to pressurize the fluid media and enable the pressurized media to expand the normally constricted flow area of said second section for flow of fluid media from said first section to said second section and through the expanded constricted flow area of the latter; said constricted flow area, upon release of the pressure, substantially inhibiting reverse flow of fluid media to said first section; said means for applying force including driving means operated by a variable electric current; said driving*

*means having an axis of oscillation; and means mounting said driving means for oscillation about said axis of oscillation.*

References Cited

The following references, cited by the Examiner, are of record in the patented file of this patent or the original patent.

UNITED STATES PATENTS

| | | | |
|---|---|---|---|
| 1,893,776 | 1/1933 | Hull | 103—148 |
| 1,988,624 | 1/1935 | Kipp | 103—148 |
| 2,105,200 | 1/1938 | Phelps | 103—152 |
| 2,393,838 | 1/1946 | Taxbox | 103—148 |

| | | | |
|---|---|---|---|
| 2,412,397 | 12/1946 | Harper | 103—148 |
| 2,527,614 | 10/1950 | Arpin | 103—148 |
| 2,689,530 | 9/1954 | Harvey | 103—148 |
| 2,888,877 | 6/1959 | Shellman et al. | 103—53 |
| 2,923,250 | 2/1960 | Hoeppel et al. | 103—148 |
| 3,127,845 | 5/1964 | Voelcker | 103—148 |

FOREIGN PATENTS

| | | |
|---|---|---|
| 597,046 | 1/1948 | Great Britain. |

HENRY F. RADUAZO, *Primary Examiner.*

U.S. Cl. X.R.

103—152